US007373239B2

(12) United States Patent
Kamado et al.

(10) Patent No.: US 7,373,239 B2
(45) Date of Patent: May 13, 2008

(54) ENGINE CONTROL DEVICE OF WORK VEHICLE

(75) Inventors: Mitsuhiko Kamado, Hirakata (JP); Shigeru Yamamoto, Hirakata (JP)

(73) Assignee: Komatsu, Ltd., Tokyo (JP)

( * ) Notice: Subject to any disclaimer, the term of this patent is extended or adjusted under 35 U.S.C. 154(b) by 87 days.

(21) Appl. No.: 11/480,417

(22) Filed: Jul. 5, 2006

(65) Prior Publication Data

US 2007/0016355 A1 Jan. 18, 2007

(30) Foreign Application Priority Data

Jul. 6, 2005 (JP) ............................ 2005-197937

(51) Int. Cl.
*G06G 7/70* (2006.01)
*G06F 19/00* (2006.01)

(52) U.S. Cl. ...................................... 701/103; 701/110

(58) Field of Classification Search ........ 701/101–105, 701/110–115; 123/41.11, 41.12, 350, 352, 123/357

See application file for complete search history.

(56) References Cited

U.S. PATENT DOCUMENTS

| | | | | |
|---|---|---|---|---|
| 4,479,532 | A | 10/1984 | Watanabe | |
| 4,493,303 | A * | 1/1985 | Thompson et al. | 123/357 |
| 4,494,404 | A * | 1/1985 | Strifler | 73/113 |
| 4,836,165 | A * | 6/1989 | Kubota et al. | 123/357 |
| 5,989,154 | A * | 11/1999 | Christensen et al. | 477/111 |
| 6,311,488 | B1 | 11/2001 | Maruta et al. | |
| 6,349,882 | B1 | 2/2002 | Kita et al. | |
| 6,361,471 | B1 * | 3/2002 | Heed | 477/43 |
| 6,481,388 | B1 | 11/2002 | Yamamoto | |
| 6,539,924 | B2 * | 4/2003 | Ricco | 123/490 |
| 6,684,145 | B1 * | 1/2004 | Gianoglio et al. | 701/54 |
| 6,772,060 | B2 | 8/2004 | McCauley et al. | |
| 2006/0229786 | A1 * | 10/2006 | Sawada | 701/50 |
| 2007/0012493 | A1 * | 1/2007 | Jones | 180/65.3 |

FOREIGN PATENT DOCUMENTS

| | | |
|---|---|---|
| JP | 62-178754 | 8/1987 |
| JP | 2711833 | 10/1997 |
| JP | 2003-161191 | 6/2003 |

* cited by examiner

*Primary Examiner*—Willis R. Wolfe, Jr.
(74) *Attorney, Agent, or Firm*—Wenderoth, Lind & Ponack, L.L.P.

(57) ABSTRACT

An engine control apparatus for a work vehicle having a cooling fan or an auxiliary device driven by an engine. The engine control apparatus is capable of operating the work vehicle with the importance placed either on amount of work or fuel economy depending on the situation, and preventing the input of excessive traveling horsepower (or working horsepower), regardless of a selected work mode, to ensure durability of the traveling power train (or work machine drive equipment). Upon selection of a work mode by the work mode selection switch, a controller controls the engine to obtain a power curve selected from those selectable for the selected work mode can be obtained, based on the coolant temperature range and the selected work mode, so that the input torque transmitted to the traveling power train does not surpass the upper limit for the input torque (rated output).

6 Claims, 13 Drawing Sheets

| SWITCH SELECT POSITION | COOLANT TEMPERATURE Tw (FAN HORSEPOWER) | | |
|---|---|---|---|
| | A: HIGH TEMPERATURE RANGE | B: MEDIUM TEMPERATURE RANGE | C: LOW TEMPERATURE RANGE |
| P: POWER MODE | POWER CURVE R1 (140PS) | POWER CURVE R2 (120PS) | POWER CURVE R3 (100PS) |
| S: STANDARD MODE | POWER CURVE R2 (120PS) | POWER CURVE R2 (120PS) | POWER CURVE R3 (100PS) |
| E: ECONOMY MODE | POWER CURVE R3 (100PS) | POWER CURVE R3 (100PS) | POWER CURVE R3 (100PS) |

FIG.5

| SWITCH SELECT POSITION | COOLANT TEMPERATURE Tw (FAN HORSEPOWER) | | |
|---|---|---|---|
| | A: HIGH TEMPERATURE RANGE | B: MEDIUM TEMPERATURE RANGE | C: LOW TEMPERATURE RANGE |
| P: POWER MODE | POWER CURVE R1 | POWER CURVE R2' | POWER CURVE R3' |
| S: STANDARD MODE | POWER CURVE R2' | POWER CURVE R2' | POWER CURVE R3' |
| E: ECONOMY MODE | POWER CURVE R3' | POWER CURVE R3' | POWER CURVE R3' |

FIG.13A

| SWITCH SELECT POSITION | COOLANT TEMPERATURE Tw (FAN HORSEPOWER) | | | |
|---|---|---|---|---|
| | A: HIGH TEMPERATURE RANGE | B1: FIRST MEDIUM TEMPERATURE RANGE | B2: SECOND MEDIUM TEMPERATURE RANGE | C: LOW TEMPERATURE RANGE |
| P: POWER MODE | POWER CURVE R1 | POWER CURVE R2' | POWER CURVE R3' | POWER CURVE R4' |
| S1: FIRST STANDARD MODE | POWER CURVE R2' | POWER CURVE R2' | POWER CURVE R3' | POWER CURVE R4' |
| S2: SECOND STANDARD MODE | POWER CURVE R3' | POWER CURVE R3' | POWER CURVE R3' | POWER CURVE R4' |
| E: ECONOMY MODE | POWER CURVE R4' | POWER CURVE R4' | POWER CURVE R4' | POWER CURVE R4' |

FIG.13B

| COOLANT TEMPERATURE Tw (FAN HORSEPOWER) | | |
|---|---|---|
| A: HIGH TEMPERATURE RANGE | B: MEDIUM TEMPERATURE RANGE | C: LOW TEMPERATURE RANGE |
| POWER CURVE R1 | POWER CURVE R2' | POWER CURVE R3' |

FIG.13C

ENGINE CONTROL DEVICE OF WORK VEHICLE

BACKGROUND OF THE INVENTION

1. Technical Field

The present invention relates to an engine control apparatus for use in a work vehicle.

2. Related Art

When the work vehicle is a bulldozer, engine output (torque) is distributed to a traveling load, work machine load, and cooling fan load through a PTO shaft. This means that the engine output (torque) is transmitted to a sprocket wheel through a traveling power train (power transmission) such as a torque converter and a transmission (hydraulic clutch), whereby crawler belts are driven and the vehicle is caused to travel. Thus, a portion of the engine horsepower is consumed as traveling horsepower (horsepower absorbed by the torque converter). The traveling horsepower input to the traveling power train must be suppressed to a certain horsepower level or lower in consideration of durability of the traveling power train.

The engine output is also transmitted to a work machine hydraulic pump to drive the work machine hydraulic pump. Pressurized oil is thereby supplied from the work machine hydraulic pump to a work machine actuator (e.g., a hydraulic cylinder or a hydraulic motor) to activate the work machine (such as a blade), whereby a work operation is performed. Thus, a portion of the engine horsepower is consumed as working horsepower (horsepower absorbed by the work machine pump).

The engine output is also transmitted to a fan hydraulic pump to drive the fan hydraulic pump. Pressurized oil is thereby supplied from the fan hydraulic pump to a fan hydraulic motor, whereby the rotation of a cooling fan is activated and coolant is held at a desired target temperature. Thus, part of the engine horsepower is consumed as fan horsepower (horsepower absorbed by the fan hydraulic pump).

Accordingly, the following relationship is established:

Engine horsepower=traveling horsepower+working horsepower+fan horsepower.

When work is done by the bulldozer, the traveling horsepower occupies a large percentage of the engine horsepower, while the working horsepower occupies a small percentage. Additionally, since the cooling fan is large in size, the working horsepower is low relative to the fan horsepower.

Consequently, the working horsepower is substantially negligible, and the relational expression above can be rewritten as follows:

Engine horsepower=traveling horsepower+fan horsepower.

The engine mounted on a bulldozer is a diesel engine, and the engine output is controlled by adjusting the amount of fuel injected into a cylinder. The adjustment is performed by controlling a governor provided in the fuel injection pump of the engine.

A variable-speed governor is typically used as the governor to adjust the engine speed and the fuel injection amount according to the load so as to obtain a target speed according to an operational amount of a throttle dial or an accelerator pedal. This means that the governor controls the fuel injection amount so as to eliminate the difference between the target speed and actual engine speed.

FIG. 1 illustrates a relationship between engine speed Ne and engine torque Te, that is an engine's power curve (maximum torque line) R. The range defined by the engine's power curve R indicates the performance that is obtainable from the engine. The governor controls the engine to prevent the torque from surpassing the engine's power curve (maximum torque line) R to exceed the smoke limit and to cause the discharge of black smoke. The governor also controls the engine to prevent the engine speed Ne from surpassing the high idle speed NH to cause overspeed.

The traveling horsepower is obtained by subtracting the fan horsepower from the engine output.

On the other hand, the target temperature of the coolant is set to a temperature at which the optimum engine efficiency is obtained. The coolant temperature is varied by adjusting the cooling fan speed (fan speed) Nf. The coolant temperature is controlled at the target temperature by adjusting the fan speed Nf in accordance with an actual coolant temperature Tw. When the coolant temperature Tw is low, the fan speed Nf is decreased so that the coolant temperature Tw matches the target temperature. When the coolant temperature Tw is high, the fan speed Nf is increased so that the coolant temperature Tw matches the target temperature. The fan horsepower becomes higher as the fan speed Nf becomes higher.

As shown in FIGS. 2A, 2B, and 2C, the fan horsepower becomes higher (the range indicated by the oblique lines becomes greater) as the coolant temperature Tw becomes higher. In accordance therewith, the traveling horsepower is decreased and the tractive force is reduced.

In a bulldozer, as described above, output from a single engine is used both for the traveling horsepower and the fan horsepower. Therefore, the engine output that can be used as the tractive force is decided depending upon the value of the coolant temperature Tw, that is, the amount of the cooling fan load.

(Related Art Found in Patent Documents)

Conventionally, techniques have been known to control an engine according to the increase of fan horsepower to prevent the reduction of traveling horsepower (tractive force), as disclosed in Japanese Patent Application Laid-Open Nos. S62-178754 and 2003-161191, for example.

Japanese Patent Application Laid-Open No. S62-178754 discloses an invention according to which fan horsepower is calculated based on fan speed, and the engine is controlled according to the magnitude of the calculated fan horsepower so as to render the tractive force fixed.

Japanese Patent Application Laid-Open No. 2003-161191 discloses an invention according to which the engine is controlled according to the magnitude of load on a cooling fan or an air conditioner system compressor so as to increase the power of the diesel engine.

Additionally, Japanese Patent No. 2711833 discloses an invention relating to a hydraulic excavator, according to which the maximum absorption torque or capacity of a variable displacement hydraulic pump is varied according to various work modes so that the work is performed with the importance placed either on the amount of work or on the fuel economy.

According to the invention disclosed in Japanese Patent No. 2711833, the selection of a work mode enables the hydraulic excavator to be operated appropriately for placing importance on the amount of work, or on the fuel economy.

However, the invention of Japanese Patent No. 2711833 does not assume a bulldozer having a cooling fan that is driven by the engine. If the invention of Japanese Patent No.

2711833 is applied to such a bulldozer, the traveling horsepower and the working horsepower will vary according to the coolant temperature. This will possibly make it impossible to attain a desired amount of work and fuel economy envisaged for each of the work modes. If the coolant temperature is low, the traveling load will become high, and traveling load that is higher than the traveling load envisaged for each work mode will possibly be input to the traveling power train to produce excessive traveling horsepower. As a result, the durability of the traveling power train may be deteriorated.

According to the inventions disclosed in Japanese Patent Application Laid-Open Nos. S62-178754 and 2003-161191, the engine output that can be used as tractive force can be held fixed regardless of the coolant temperature or the magnitude of the cooling fan load. However, it is impossible to operate the work vehicle in accordance with the operating situation, for example with the importance placed on the amount of work, or with the importance placed on the fuel economy.

The present invention has been made in view of the circumstances described above. It is therefore an object of the present invention to enable a work vehicle having a cooling fan or any other auxiliary device driven by the engine to be operated, depending on operating situation, with the importance placed on the amount of work or on the fuel economy, and to ensure the durability of a traveling power train (or work machine drive equipment) regardless of which work mode is selected, by preventing the input of excessive traveling horsepower (or working horsepower).

SUMMARY OF THE INVENTION

A first aspect of the invention relates to an engine control apparatus for use in a work vehicle in which an engine torque is transmitted to a traveling body and/or a work machine as well as to a cooling fan to perform traveling and/or work operation as well as to drive the cooling fan, the engine control apparatus comprising:

work mode selection means for selecting a work mode according to a magnitude of traveling load and/or workload;

fan load detection means for detecting a magnitude of load on the cooling fan;

power curve setting means in which a plurality of power curves each representing a relationship between an engine speed and the torque are set;

power curve selection means for selecting, when one of the work modes is selected by the work mode selection means, a power curve from among the power curves selectable for the selected work mode in accordance with the magnitude of the load on the cooling fan, so that the input torque transmitted to the traveling body and/or the work machine does not surpass an upper limit of the input torque transmitted to the traveling body and/or the work machine, the selectable power curves being predetermined for each of the work modes and the upper of the input torque transmitted to the traveling body and/or the work machine being predetermined; and control means for controlling the engine so that the selected power curve is obtained.

A second aspect of the invention relates to an engine control apparatus for use in a work vehicle in which an engine torque is transmitted to a traveling body and/or a work machine as well as to an auxiliary device to perform traveling and/or work operation as well as to drive the auxiliary device, the engine control apparatus comprising:

work mode selection means for selecting a work mode according to a magnitude of traveling load and/or workload;

auxiliary device load detection means for detecting a magnitude of load on the auxiliary device;

power curve setting means in which a plurality of power curves each representing a relationship between an engine speed and the torque are set;

a power curve selection unit for selecting one of the power curves; and power curve selection means for selecting, when one of the work modes is selected by the work mode selection means, a power curve from among the power curves selectable for the selected work mode in accordance with the magnitude of the load on the auxiliary device, so that the input torque transmitted to the traveling body and/or the work machine does not surpass an upper limit of the input torque transmitted to the traveling body and/or the work machine, the selectable power curves being predetermined for each of the work modes and the upper of the input torque transmitted to the traveling body and/or the work machine being predetermined; and control means for controlling the engine so that the selected power curve is obtained.

A third aspect of the invention also relates to an engine control apparatus for use in a work vehicle in which an engine torque is transmitted to a traveling body and/or a work machine as well as to a cooling fan to perform traveling and/or work operation as well as to drive the cooling fan, the engine control apparatus comprising:

fan load detection means for detecting a magnitude of load on the cooling fan;

cooling fan control means for controlling the drive of the cooling fan so that, in a low speed range where an engine speed is a predetermined speed or lower, a fan horsepower consumed by the cooling fan is limited to a lower value than that in a high speed range in order to ensure necessary horsepower for the traveling body and/or the work machine;

power curve setting means in which a plurality of power curves each representing a relationship between the engine speed and the torque are set, the power curves following same or substantially same curves in the low engine speed range, while following different curves in the high engine speed range;

power curve selection means for selecting one of the power curves according to a magnitude of the detected load on the cooling fan, so that an input torque transmitted to the traveling body and/or the work machine does not surpass an upper limit for the input torque, the upper limit of the input torque transmitted to the traveling body and/or the work machine being predetermined; and control means for controlling the engine so that the selected power curve is obtained.

A fourth aspect of the invention relates to the engine control apparatus for use in a work vehicle according to the third aspect, further comprising:

work mode selection means for selecting a work mode according to a magnitude of traveling load and/or workload, wherein:

a plurality of selectable power curves are predetermined for each of the work modes so that the power curves follow same or substantially same curves in the low engine speed range and follow different curves in the high engine speed range;

the upper limit is set for the input torque transmitted to the traveling body and/or the work machine; and when one of the work modes is selected by the work mode selection means, the power curve selection means selects a power curve from among the power curves selectable for the selected work mode in accordance with the magnitude of the detected load on the cooling fan, so that the input torque transmitted to the traveling body and/or the work machine does not surpass the upper limit of the input.

A fifth aspect of the invention relates to the engine control apparatus for use in a work vehicle according to the third aspect, wherein:

there are set in the power curve setting means a maximum-horsepower power curve on which a maximum horsepower that the engine can output is obtained and a low-horsepower power curve on which a lower horsepower than on the maximum-horsepower power curve is obtained; and the low-horsepower power curve is set as a power curve having high torque rise by drawing a curved line on which same or substantially same high torque as on the maximum-horsepower power curve is obtained in the low speed range of the engine, drawing a curved line on which a lower torque than on the maximum-horsepower power curve is obtained in the high speed range of the engine, and connecting these curved lines.

A sixth aspect of the invention relates to the engine control apparatus for use in a work vehicle according to the fourth aspect, wherein:

there are set in the power curve setting means a maximum-horsepower power curve on which a maximum horsepower that the engine can output is obtained and a low-horsepower power curve on which a lower horsepower than on the maximum-horsepower power curve is obtained; and the low-horsepower power curve is set as a power curve having high torque rise by drawing a curved line on which same or substantially same high torque as on the maximum-horsepower power curve is obtained in the low speed range of the engine, drawing a curved line on which a lower torque than on the maximum-horsepower power curve is obtained in the high speed range of the engine, and connecting these curved lines.

According to the first and second aspects of the invention, upon selection of a work mode by a selection switch 31, a controller 20 selects a power curve from power curves selectable for the selected work mode among the power curves R1, R2, and R3 (FIG. 6A) (from the power curves R1, R2, and R3 when work mode P is selected, from the power curves R2 and R3 when work mode S is selected, and power curve R3 when work mode E is selected), and so that input torque transmitted to a traveling power train 10 does not exceed the upper limit for the input torque (maximum torque line R4 corresponding to rated output of 70 PS), based on the coolant temperature range A, B, or C and the work mode P, S, or E, as shown in FIG. 5. The engine 1 is controlled so that the selected power curve is obtained, as shown in FIGS. 7A to 7C, 8A to 8C, and 9A to 9C.

Therefore, the engine can be operated with the importance placed on the amount of work or on fuel economy, depending on the selection of the work mode P, S, or E (FIGS. 7A to 7C, 8A to 8C, and 9A to 9C). Further, it is possible to prevent excessive traveling horsepower from being input to the traveling power train 10 (the traveling horsepower is limited for example to the one corresponding to a rated output of 70PS) regardless of which one of the work modes P, S, and E is selected. Thus, durability can be ensured for the traveling power train 10 (FIGS. 7A to 7C, 8A to 8C, and 9A to 9C).

This can be said not only when a cooling fan 16 is driven by the engine 1, but also when an auxiliary device such as an electric generator or a compressor is driven by the engine 1 (the second aspect of the invention).

According to the third, fourth, fifth, and sixth aspects of the invention, as shown in FIG. 10B, the drive of the cooling fan 16 is controlled to limit the fan horsepower consumed by the cooling fan 16 to a lower value in the low speed range where the speed Ne of the engine 1 is a predetermined speed Nec or lower than in the high speed range, so that a necessary horsepower can be ensured for the traveling body and/or the work machine.

As shown in FIG. 11B, a plurality of power curves R1, R2', and R3' are set to follow a same or substantially same curved paths in the low speed range of the engine 1 and to follow different curved paths in the high speed range of the engine 1.

Like the first aspect of the invention described above, a power curve is selected according to the selected work mode and the magnitude of detected coolant temperature in the engine 1 (detected load on the cooling fan 16), and the engine 1 is controlled so that the selected power curve is obtained. This makes it possible, like in the first aspect of the invention, to suppress the horsepower consumed by the traveling power train 10 to the upper limit or below in the high speed range of the engine 1 and to keep the coolant temperature in the engine 1 at a target temperature, regardless of which one of the power curves R1, R2', and R3' is selected.

When the maximum-horsepower power curve R1 is selected, the fan horsepower is controlled lower by the extent indicated by the oblique lines a in FIG. 10B in the low speed range of the engine 1, and the traveling horsepower (or the working horsepower) is increased by that much. This makes it possible to prevent the engine stall when the speed of the engine 1 drops low.

When the low-horsepower power curve R2' is selected, the fan horsepower is controlled lower by the extent indicated by the oblique lines a in FIG. 10B in the low speed range of the engine 1, while a high torque is obtained as shown in FIG. 11B similarly to the case when the maximum horsepower curve R1 is selected (the obtained torque is higher by the extent b than that on the low power curve R2 in FIG. 11A), and the traveling horsepower (or the working horsepower) is increased by that much. This also makes it possible to prevent the engine stall.

When the low-horsepower power curve R3' is selected, the fan horsepower is controlled lower by the extent indicated by a in FIG. 10B in the low speed range of the engine 1, while a high torque is obtained as shown in FIG. 11B similarly to the case when the maximum horsepower curve R1 is selected (the obtained torque is higher by the extent c than that on the low power curve R3 in FIG. 11A), and the traveling horsepower (or the working horsepower) is increased by that much. This also makes it possible to prevent the engine stall.

The third aspect of the invention is applicable to a work vehicle having no work mode selection switch 31. According to the third aspect of the invention, for example as shown in FIG. 13C, the power curve R1 is selected when the detected coolant temperature is in the high temperature range A, the power curve R2 is selected when the detected coolant temperature is in the medium temperature range B, and the power curve R3' is selected when the detected coolant temperature is in the low temperature range C. The engine 1 is controlled so that the selected power curve is obtained.

The fourth aspect of the invention is applicable to a work vehicle having a work mode selection switch 31.

According to the fourth aspect of the invention, for example as shown in FIG. 13A, one of the power curves R1, R2', and R3' is selected according to the currently selected work mode, namely one of the power mode P, the standard mode S, and the economy mode E, and the temperature range which the currently detected coolant temperature Tw belongs to, namely one of the high temperature range A, the medium temperature range B, and the low temperature range C, and the engine 1 is controlled so that the selected power mode is obtained.

According to the fifth and sixth aspects of the invention, for example as shown in FIG. 12, the low-horsepower power curve R3' is set as a power curve having high torque rise by drawing a curved line on which a same or substantially same high torque as on the maximum-horsepower power curve R1 is obtained in the low speed range of the engine 1, drawing a curved line on which a lower torque than on the maximum-horsepower power curve R1 is obtained in the high speed range of the engine, and connecting these curved paths. The other low-horsepower power curves R2' and R4' are also set in the same manner. Thus, since the power curves R2', R3', and R4' are set to have high torque rise, the engine stall can be prevented even more effectively.

BRIEF DESCRIPTION OF THE DRAWINGS

FIG. 5 is a diagram showing the contents of a data table stored in a controller;

FIG. 6A is a diagram illustrating power curves of various engines, while

FIG. 10A is a diagram showing the relationship between engine speed and cooling fan speed as a comparative example to the embodiment of the present invention, while

FIG. 11A is a diagram showing several different power curves as a comparative example to the embodiment of the present invention, while FIG. 10B is a diagram showing several different power curves according to the embodiment of the present invention;

FIGS. 13A, 13B, and 13C are diagrams showing examples of contents of data table used for selecting the power curves shown in FIG. 11B or FIG. 12.

DETAILED DESCRIPTION OF THE INVENTION

First Embodiment

An engine control apparatus for use in a work vehicle according to a preferred embodiment of the present invention will be described with reference to the accompanying drawings.

Figure 3:
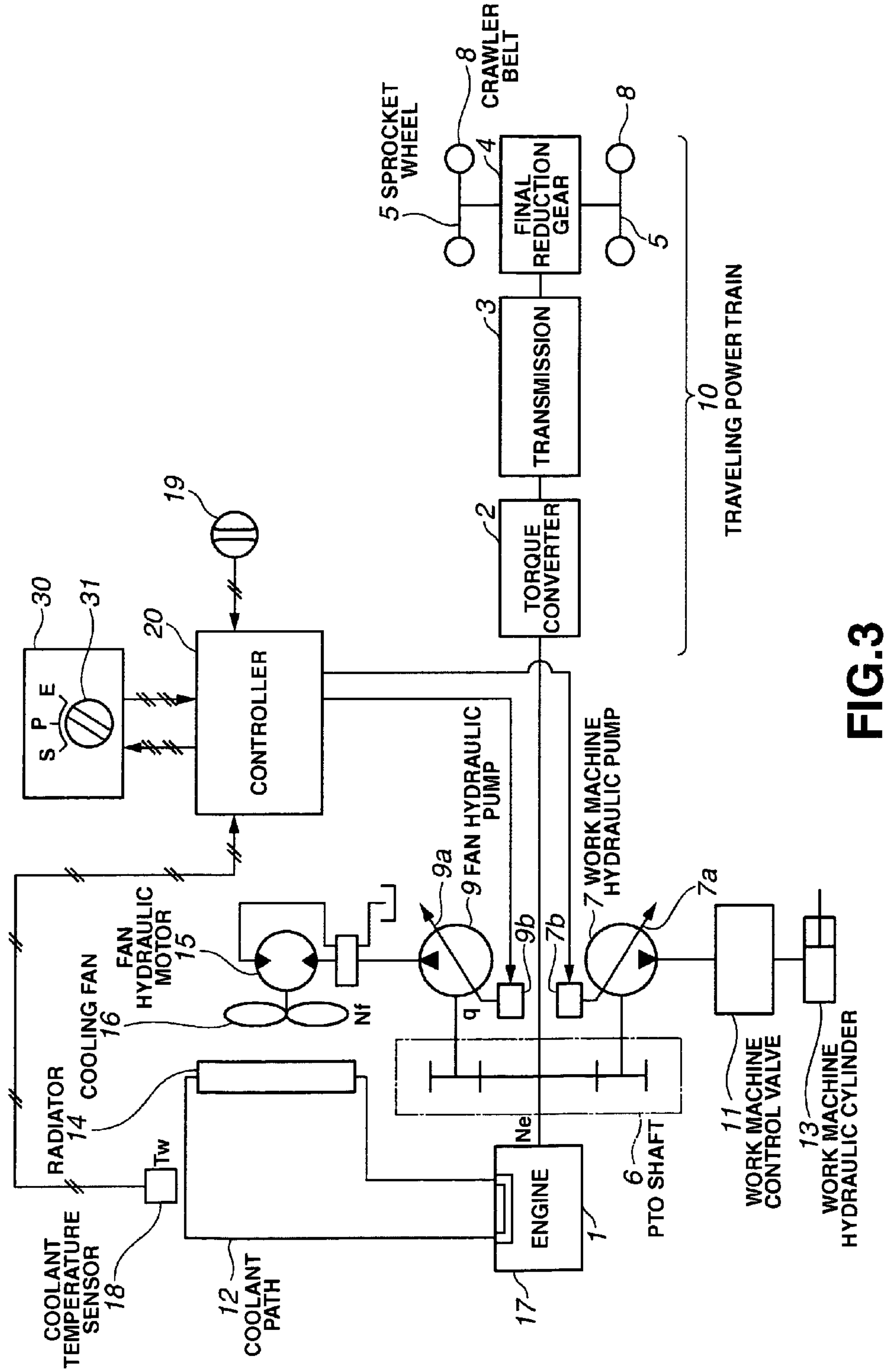
FIG. 3 is a diagram illustrating configuration of a bulldozer that is a work vehicle according to an embodiment of the invention.

FIG. 3 shows a part of a bulldozer according to an embodiment of the present invention, the part relating to the present invention.

As shown in FIG. 3, the bulldozer has an engine 1 whose output shaft is connected to a power take-off (PTO) shaft 6. The PTO shaft 6 is connected to a torque converter 2, and also connected to a work machine hydraulic pump 7 and a fan hydraulic pump 9.

The work machine hydraulic pump 7 and the fan hydraulic pump 9 are variable displacement hydraulic pumps having swash plate drive units 7*b* and 9*b*, respectively. The swash plate drive units 7*b* and 9*b* vary the inclination angles of swash plates 7*a* and 9*a*, respectively, to change the pump capacity q (cc/rev).

The output of the engine 1 is transmitted to a sprocket wheel 5 through the torque converter 2, a transmission 3, and a final reduction gear 4 to drive rotation of the sprocket wheel 5. The torque converter 2, the transmission 3, and the final reduction gear 4 together form a traveling power train (power transmission) 10. When the rotation of the sprocket wheel 5 is driven, crawler belts 8 engaged with the sprocket wheel 5 are driven to cause the bulldozer to travel. Thus, a portion of the horsepower of the engine 1 is consumed as traveling horsepower (horsepower absorbed by the torque converter). The traveling horsepower input to the traveling power train 10 must be suppressed at a certain horsepower or below in consideration of the durability of the traveling power train 10.

The transmission 3 is composed of a forward hydraulic clutch, a reverse hydraulic clutch, and speed clutches (a first-speed hydraulic clutch, a second-speed hydraulic clutch, and a third-speed hydraulic clutch). Either the forward hydraulic clutch or the reverse hydraulic clutch is selected to cause the bulldozer to travel forward or backward. One of the speed clutches is selected to change the speed.

The output of the engine 1 is also transmitted to the work machine hydraulic pump 7.

When the work machine hydraulic pump 7 is driven, discharged pressurized oil is supplied to a work machine hydraulic cylinder 13 via a work machine control valve 11.

The work machine hydraulic cylinder 13 is connected to a blade provided in a front part of the vehicle body. The blade is activated by the pressurized oil being supplied to the work machine hydraulic cylinder 13. The spool of a work machine control valve 11 is moved in accordance with operation of a work machine operating lever (not shown). The opening area of the control valve 11 is varied according to the movement of the spool, whereby the flow rate of pressurized oil supplied to the work machine hydraulic cylinder 13 is varied. Although the bulldozer is provided with other work machines than the blade, FIG. 3 representatively shows only the work machine drive equipment for the blade (7, 11, and 13). Thus, a portion of the engine horsepower is consumed as working horsepower (horsepower absorbed by the work machine pump).

The output of the engine 1 is also transmitted to the fan hydraulic pump 9.

When the fan hydraulic pump 9 is driven, discharged pressurized oil is supplied to a fan hydraulic motor 15. A rotating shaft of a cooling fan 16 is connected to the drive shaft of the fan hydraulic motor 15. The fan hydraulic motor 15 is driven by the pressurized oil being supplied to the fan hydraulic motor 15, and the rotation of the cooling fan 16 is activated in response thereto. Thus, a portion of the horsepower of the engine 1 is consumed as fan horsepower (horsepower absorbed by the fan hydraulic pump).

Consequently, a relationship expressed by the following formula is established:

Engine horsepower=traveling horsepower+working horsepower+fan horsepower.

When work is done by the bulldozer, the traveling horsepower occupies a large percentage of the engine horsepower, while the working horsepower occupies a small percentage. Additionally, since the cooling fan is large in size, the working horsepower is low relative to the fan horsepower.

Consequently, the working horsepower is substantially negligible, and the relational expression above can be rewritten as follows:

Engine horsepower=traveling horsepower+fan horsepower.

A radiator 14 is arranged at a position facing the cooling fan 16. A coolant path 12 is arranged to communicate between the radiator 14 and a passage (water jacket) 17 within the engine 1. Coolant circulates between the radiator 14 and the passage (water jacket) 17 within the engine 1 through the coolant path 12.

A coolant temperature sensor 18 is provided in the coolant path 12 to detect the coolant temperature Tw (° C.). According to this embodiment, the load on the cooling fan 16 is detected by the coolant temperature sensor 18 detecting the coolant temperature.

A detection signal from the coolant temperature sensor 18 is input to the controller 20.

The target temperature of the coolant is set a temperature at which the optimal efficiency of the engine 1 is obtained. The coolant temperature Tw is varied by adjusting the speed Nf of the cooling fan 16 (fan speed). The coolant temperature Tw is controlled to the target temperature by adjusting the fan speed Nf according to an actual temperature of the coolant. The control of the fan speed Nf is performed by driving the swash plate 9*a* of the fan hydraulic pump 9 by means of the swash plate drive unit 9*b* to adjust the inclination angle (capacity) and to thereby adjust the flow rate (L/min) of the pressurized oil supplied to the fan hydraulic motor 15.

The controller 20 controls the fan speed in the following manner. When the coolant temperature Tw is low, the controller 20 performs adjustment to reduce the fan speed Nf to make the coolant temperature Tw match the target temperature. In contrast, when the coolant temperature Tw is high, the controller 20 performs adjustment to increase the fan speed Nf to make the coolant temperature Tw match the target temperature.

Figure 6A:
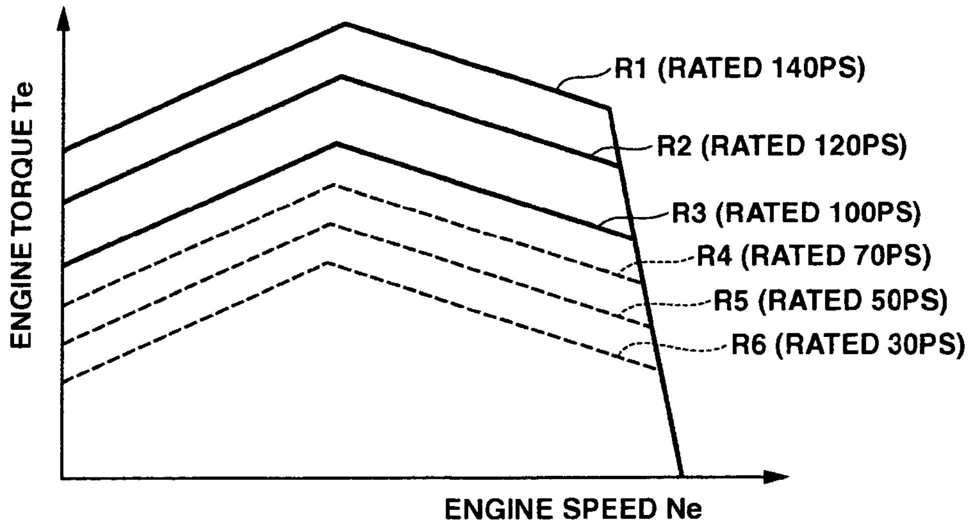
Figure 6B:
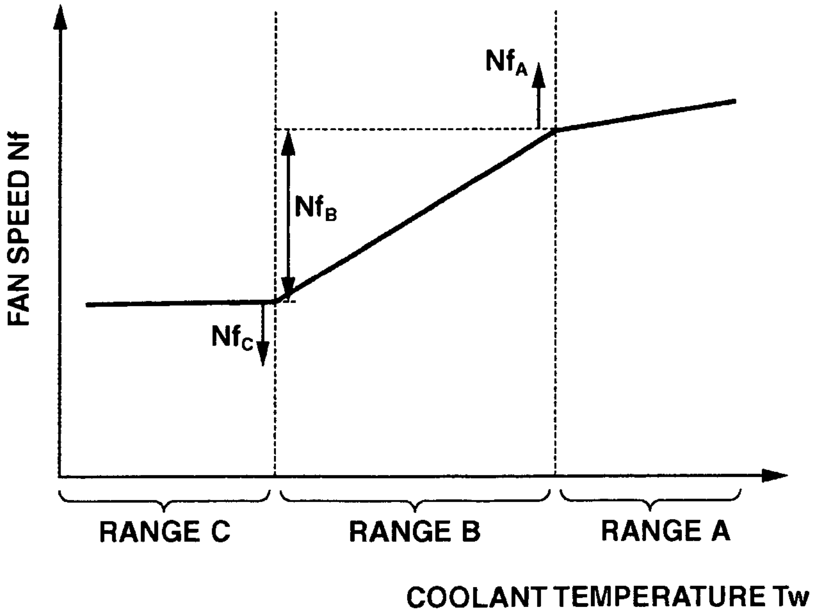
FIG. 6B is a diagram illustrating that the fan speed varies according to coolant temperature, showing coolant temperature ranges.

FIG. 6B is a fan speed control map showing the relationship between the coolant temperature Tw and the fan speed Nf.

As seen from FIG. 6B, the controller 20 adjusts the fan speed Nf to be within a low speed range Nfc when the coolant temperature Tw is in a low temperature range C. When the coolant temperature Tw is in a high temperature range A, the controller 20 adjusts the fan speed Nf to be within a high speed range NfA. When the coolant temperature Tw is in a medium temperature range B between the low temperature range C and the high temperature range A, the controller 20 adjusts the fan speed Nf to be within a medium speed range NfB between the low speed range Nfc and the high speed range NfA.

The fan horsepower becomes higher as the fan speed Nf is increased. Accordingly, the fan horsepower, or the fan load becomes higher as the coolant temperature Tw shifts from the low temperature range C, to the medium temperature range B, and to the high temperature range A.

An engine speed setter (throttle dial) 19 is provided in the driver's cab of the bulldozer. The engine speed setter 19 is a setting device for setting a target speed of the engine 1. When the engine speed setter 19 is operated, an engine target speed signal having a magnitude according to a position to which the engine speed setter 19 is operated is output to the controller 20.

The controller 20 controls the engine 1 to the target speed according to the operational amount of the engine speed setter 19.

Figure 4:
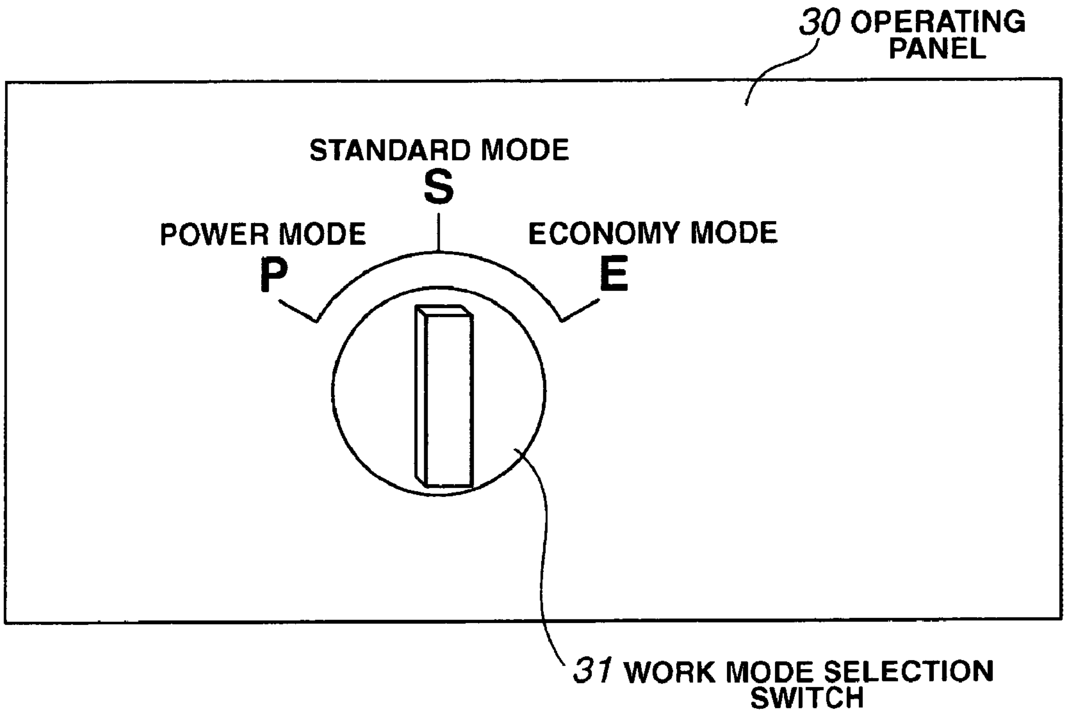
FIG. 4 is a diagram illustrating a work mode selection switch provided on an operating panel.

An operating panel 30 as shown in FIG. 4 is provided in the driver's cab of the bulldozer.

The operating panel 30 is provided with a work mode selection switch 31.

The work mode selection switch 31 is a switch for selecting one of work modes according to the magnitude of the traveling load. The work modes consist of "power mode" P, "standard mode" S, and "economy mode" E.

The "power mode" P is a work mode which is selected in a working situation in which a high traveling load requires a large engine output. The "power mode" P is selected when the importance is placed on the amount of work. The selection of the "power mode" P enables a large amount of work to be obtained during engine operation, but deteriorates the fuel economy during engine operation.

The "economy mode" E is a work mode which is selected in a working situation in which a low traveling load requires a low engine output. The "economy mode" E is selected when the importance is placed on the fuel economy. The selection of the "economy mode" E improves the fuel economy during engine operation, but decreases the amount of work obtained during engine operation.

The "standard mode" S is a work mode which is selected in a working situation in which a medium traveling load requires a medium engine output. The "standard mode" S is selected when the amount of work is not considered so important as when the "power mode" P is selected but a greater amount of work is required than when the "economy mode" E is selected, and when the fuel economy is not considered so important as when the "economy mode" E is selected but a better fuel economy is desired than when the "power mode" P is selected. When the "standard mode" S is selected, the fuel economy during engine operation assumes a normal state that is intermediate between the state when the "economy mode" E is selected and the state when the "power mode" P is selected. The amount of work obtained during engine operation also assumes a medium amount of work that is intermediate between the amounts obtained when the "economy mode" E is selected and when the "power mode" P is selected.

A signal indicating the work mode selected by the work mode selection switch 31 on the operating panel 30 is input to the controller 20.

The engine 1 is a diesel engine, and its output is controlled by adjusting the amount of fuel injected into a cylinder. This adjustment is performed by controlling a governor provided in the fuel injection pump of the engine 1. A variable-speed governor is typically used as the governor. The governor adjusts the engine speed and the fuel injection amount according to the load so that the target speed is obtained according to the operational amount of the engine speed setter 19. This means that the governor increases or decreases the fuel injection amount so as to eliminate the difference between the target speed and an actual engine speed.

Figure 1:
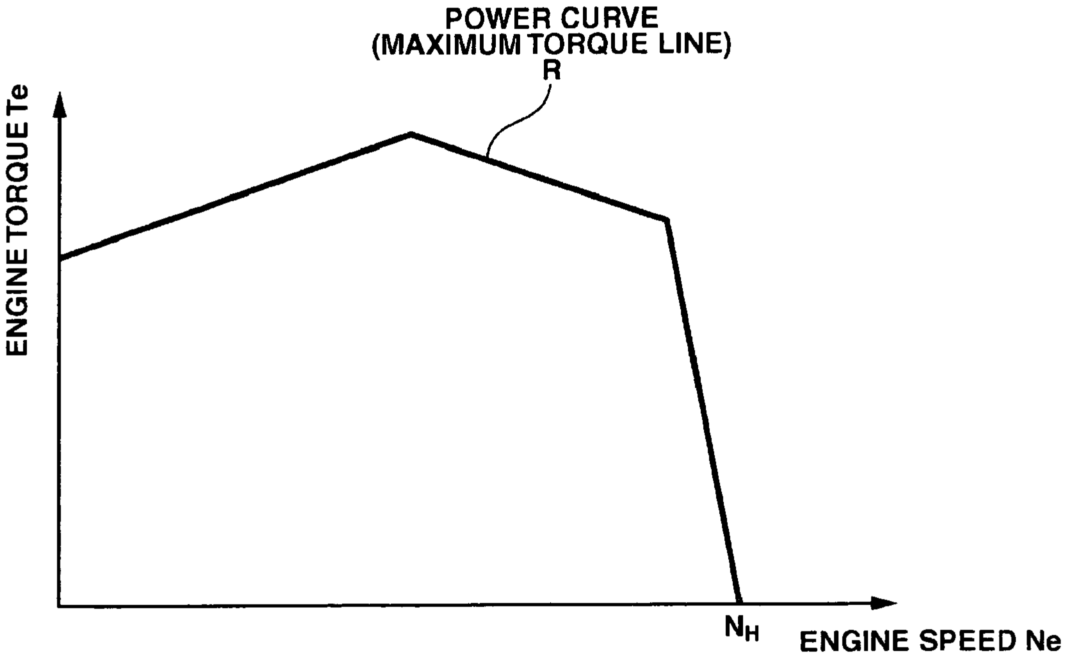
FIG. 1 is a diagram illustrating the relationship between engine speed and engine torque.

FIG. 1 shows the relationship between the engine speed Ne and the engine torque Te, or the engine's power curve (maximum torque line) R. The region defined by the engine's power curve R indicates performance obtainable by the engine. The governor controls the engine 1 to prevent the torque from surpassing the engine's power curve (maximum torque line) R to exceed the smoke limit and to cause the discharge of black smoke. The governor also controls the engine to prevent the engine speed Ne from surpassing the high idle speed NH to cause overspeed.

According to the above-mentioned formula: "engine horsepower=traveling horsepower+fan horsepower", the traveling horsepower can be obtained by subtracting the fan horsepower from the engine output.

On the other hand, as described above, the fan horsepower becomes higher as the coolant temperature Tw shifts from the low temperature range C, to the medium temperature range B, and to the high temperature range A.

Figure 2A:
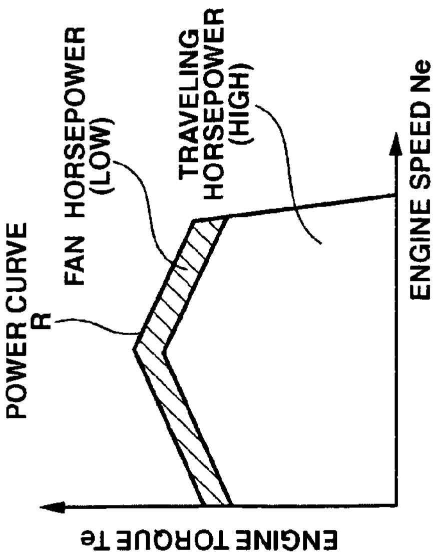
FIGS. 2A to 2C are diagrams for explaining the difference in magnitude of the consumed fan horsepower depending on levels of the coolant temperature.
Figure 2B:
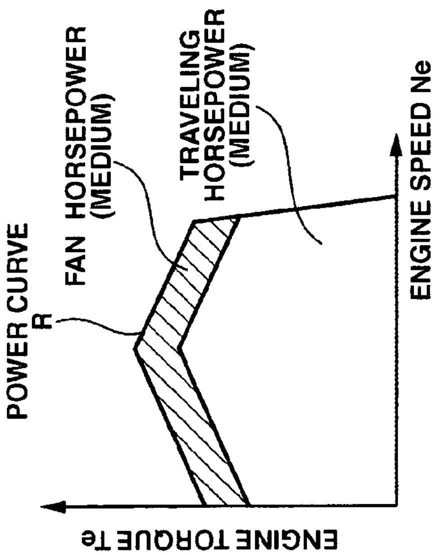
Figure 2C:
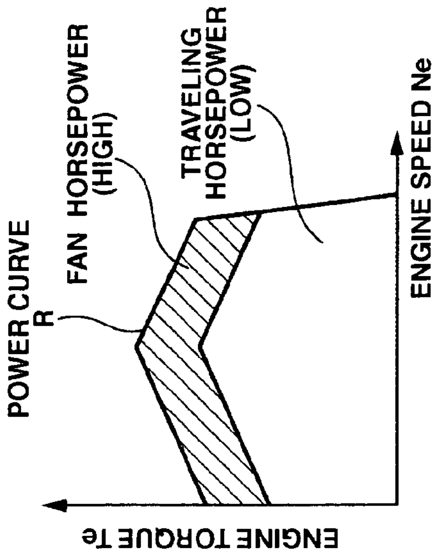

Therefore, as shown in FIGS. 2A, 2B, and 2C, the fan horsepower becomes higher (the range indicated by the oblique line becomes greater) as the coolant temperature Tw is increased. In accordance therewith, the traveling horsepower is decreased and the tractive force is reduced.

In the bulldozer, as described above, output from the single engine 1 is used both for the traveling horsepower and the fan horsepower. Therefore, the engine output that can be used as the tractive force is decided depending upon the value of the coolant temperature Tw, that is, the magnitude of the load on the cooling fan 16.

Further, the traveling horsepower varies depending on the coolant temperature Tw. This may make it impossible to obtain a desired amount of work or desired fuel economy that is originally assumed for each of the work modes P, S, and E. In contrast, if the coolant temperature Tw is low, the traveling load becomes higher, and a traveling load that is higher than the load originally assumed for each work mode may be input to the traveling power train 10. As a result, the excessive traveling horsepower may deteriorate the durability of the traveling power train.

In this first embodiment, therefore, the engine 1 is enabled to operate with the importance placed either on the amount of work or on the fuel economy depending on the selection of the work mode P, S, or E. In addition, the engine 1 is controlled to prevent the input of excessive traveling horsepower to the traveling power train 10, regardless of which work mode P, S, or E is selected, by selecting an optimal power curve R based on the temperature range A, B, or C of the coolant temperature Tw, and the selected position P, S, or E of the work mode selection switch 31.

A plurality of power curves R1, R2, and R3 as shown FIG. 6A are stored in the memory of the controller 2. The power curves R1, R2, and R3 are for example set such that the torque value and the rated output are increased in the sequence of R3, R2, and R1. For example, the power curve R1 corresponds to a rated output of 140 PS, the power curve R2 to a rated output of 120 PS, and the power curve R3 to a rated output of 100 PS.

Such power curves are set for each of the work modes P, S, and E as selectable power curves.

The work mode P is associated with the selectable power curves R1, R2, and R3.

The work mode S is associated with the selectable power curves R2 and R3.

The work mode E is associated with the selectable power curve R3.

An upper limit is set for the input torque transmitted to the traveling power train 10. More specifically, the maximum torque line R4 shown in FIG. 6A indicates the upper limit for the input torque transmitted to the traveling power train 10. The maximum torque line R4 corresponds to a rated output of 70 PS. This maximum torque line R4 is preset such that a sufficient tractive force can be obtained and the work can be performed with a sufficient amount of work when the power mode P is selected.

R5 in FIG. 6A indicates a maximum torque line of which the torque value and the rated output are lower than those of the maximum torque line R4 (corresponding to a rated output of 50 PS). R6 in FIG. 6A indicates a maximum torque line of which the torque value and the rated output are lower than those of the maximum torque lines R4 and R5 (corresponding to a rated output of 30 PS).

When one of the work modes is selected by means of the work mode selection switch 31, the controller 20 selects a power curve from the selectable power curves corresponding to the selected power mode among the power curves R1, R2, and R3 stored therein, and such that the input torque transmitted to the traveling power train 10 does not exceed the input torque upper limit (the maximum torque line R4 corresponding to the rated output of 70PS), based on the coolant temperature range A, B, or C and the selected work mode P, S, or E.

The following description will be made on the assumption that the fan horsepower (horsepower corresponding to the regions indicated by the oblique lines in FIGS. 2A, 2B, and 2C) is 30 PS, 50 PS, and 70PS when the coolant temperature Tw is in the low temperature range C, the medium temperature range B, and the high temperature range A, respectively.

FIG. 5 is a data table showing a relationship between the currently selected work modes, namely, the power mode P, the standard mode S, and the economy mode E, the ranges of the currently selected coolant temperature Tw, namely, the high temperature range A, the medium temperature range B, and the low temperature range C, and the selectable power curves R1, R2, and R3. This data table is stored in the memory of the controller 20.

According to the data table of FIG. 5, the controller 20 selects one of the power curves R1, R2, and R3 as shown in FIG. 6A from the memory and controls the engine 1 so that the selected power curve can be obtained. Specifically, the controller 20 controls the engine 1 so as to prevent the torque from surpassing the selected engine's power curve (maximum torque line) R1, R2, or R3 to exceed the smoke limit and to prevent the engine speed Ne from surpassing the high idle speed NH to cause overspeed.

Figure 7C:
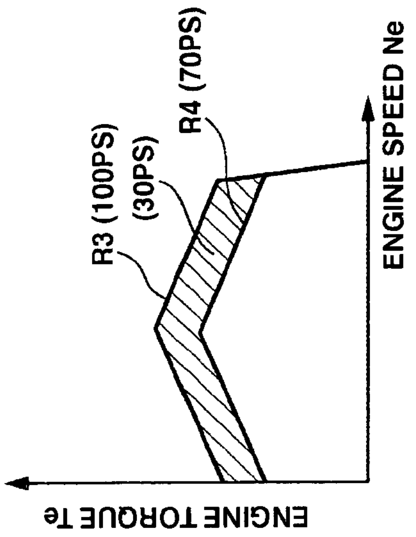
FIGS. 7A, 7B, and 7C are diagrams illustrating the power curves respectively corresponding to the high, medium and low coolant temperature ranges to which a currently detected coolant temperature belongs, when the power mode is selected by the work mode selection switch.
Figure 7B:
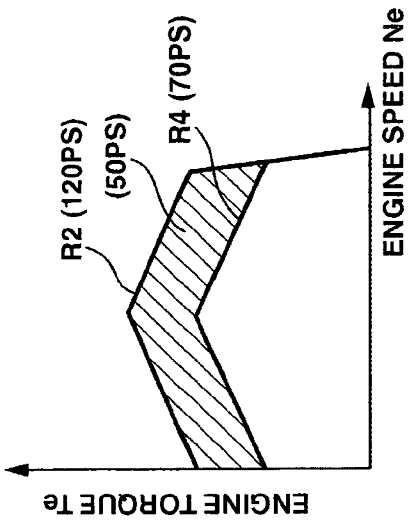
Figure 7A:
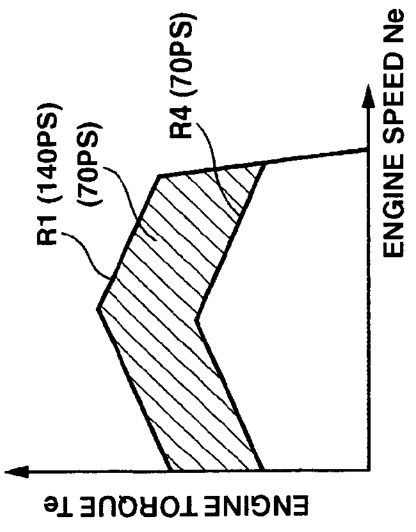

FIGS. 7A, 7B, and 7C respectively show the power curves R1, R2, and R3 which are selected when the power mode P is selected by the work mode selection switch 31 and the currently detected coolant temperature Tw is in the high temperature range A, the medium temperature range B, and the low temperature range C, respectively.

As shown in FIG. 7A, when the power mode P is selected and the coolant temperature Tw is in the high temperature range A, the engine 1 is controlled so that the power curve R1 (corresponding to the rated output of 140 PS) is obtained. In this case, the fan horsepower (indicated by the oblique lines) is 70 horsepower, and the torque input to the traveling power train 10 is limited to the maximum torque line R4 (corresponding to the rated output of 70 PS) or below.

As shown in FIG. 7B, when the power mode P is selected and the coolant temperature Tw is in the medium temperature range B, the engine 1 is controlled so that the power curve R2 (corresponding to the rated output of 120 PS) is obtained. In this case, the fan horsepower (indicated by the oblique lines) is 50 horsepower, and the torque input to the traveling power train 10 is limited to the maximum torque line R4 (corresponding to the rated output of 70 PS) or below.

As shown in FIG. 7C, when the power mode P is selected and the coolant temperature Tw is in the low temperature range C, the engine 1 is controlled so that the power curve R3 (corresponding to the rated output of 100 PS) is obtained. In this case, the fan horsepower (indicated by the oblique lines) is 30 horsepower, and the torque input to the traveling power train 10 is limited to the maximum torque line R4 (corresponding to the rated output of 70 PS) or below.

Figure 8A:
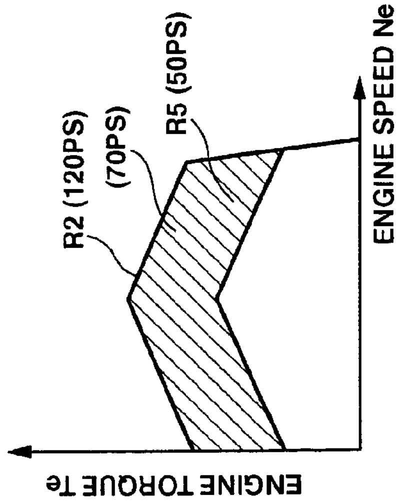
FIGS. 8A, 8B, and 8C are diagrams illustrating the power curves respectively corresponding to the high, medium and low coolant temperature ranges to which a currently detected coolant temperature belongs, when the standard mode is selected by the work mode selection switch.
Figure 8B:
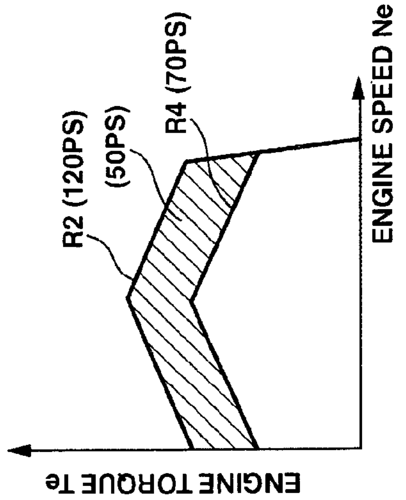
Figure 8C:
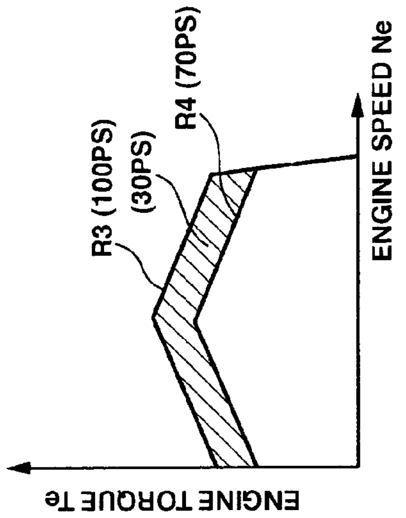

FIGS. 8A, 8B, and 8C respectively show the power curves R2, R2, and R3 which are selected when the standard mode S is selected by the work mode selection switch 31 and the currently detected coolant temperature Tw is in the high temperature range A, the medium temperature range B, and the low temperature range C, respectively.

As shown in FIG. 8A, when the standard mode S is selected and the coolant temperature Tw is in the high temperature range A, the engine 1 is controlled so that the power curve R2 (corresponding to the rated output of 120PS) is obtained. In this case, the fan horsepower (indicated by the oblique lines) is 70 horsepower, and the torque input to the traveling power train 10 is limited to the maximum torque line R5 (corresponding to the rated output of 50 PS) or below.

As shown in FIG. 8B, when the standard mode S is selected and the coolant temperature Tw is in the medium temperature range B, the engine 1 is controlled so that the power curve R2 (corresponding to the rated output of 120 PS) is obtained. In this case, the fan horsepower (indicated by the oblique lines) is 50 horsepower, and the torque input to the traveling power train 10 is limited to the maximum torque line R4 (corresponding to the rated output of 70 PS) or below.

As shown in FIG. 8C, when the standard mode S is selected and the coolant temperature Tw is in the low temperature range C, the engine 1 controlled so that the power curve R3 (corresponding to the rated output of 100 PS) is obtained. In this case, the fan horsepower (indicated by the oblique lines) is 30 horsepower, and the torque input to the traveling power train 10 is limited to the maximum torque line R4 (corresponding to the rated output of 70PS) or below.

Figure 9C:
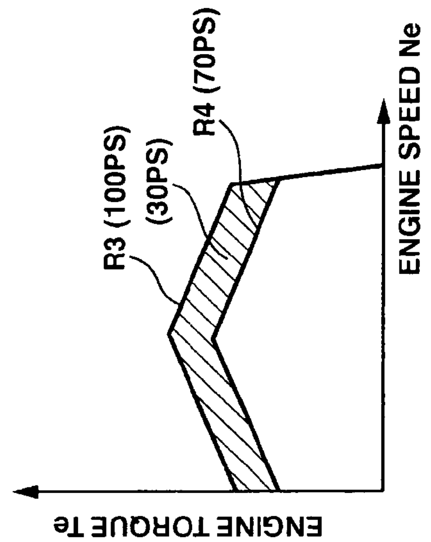
FIGS. 9A, 9B, and 9C are diagrams illustrating the power curves respectively corresponding to the high, medium and low coolant temperature ranges to which a currently detected coolant temperature belongs, when the economy mode is selected by the work mode selection switch.
Figure 9B:
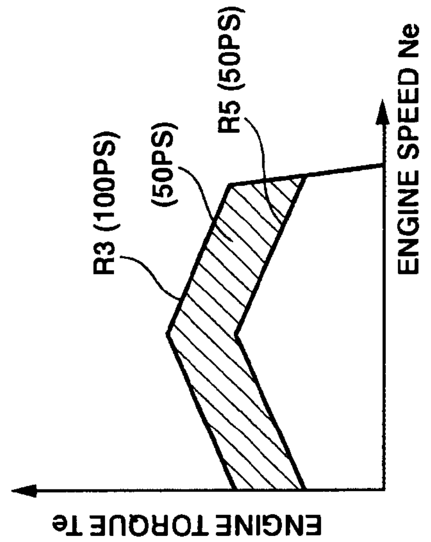
Figure 9A:
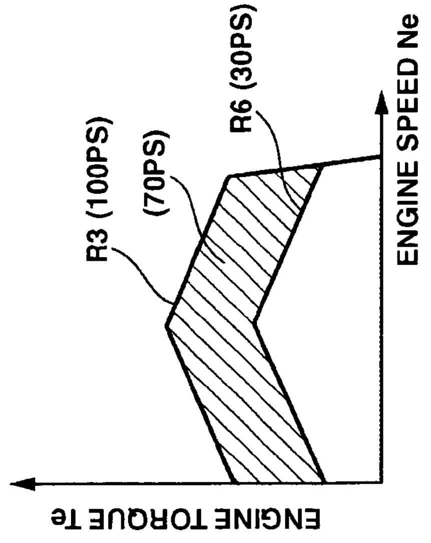

FIGS. 9A, 9B, and 9C respectively show the power curves R3, R3, and R3 which are selected when the economy mode E is selected by the work mode selection switch 31 and the currently detected coolant temperature Tw is in the high temperature range A, the medium temperature range B, and the low temperature range C, respectively.

As shown in FIG. 9A, when the economy mode E is selected and the coolant temperature Tw is in the high temperature range A, the engine 1 is controlled so that the power curve R3 (corresponding to the rated output of 100 PS) is obtained. In this case, the fan horsepower (indicated by the oblique lines) is 70 horsepower, and the torque input to the traveling power train 10 is limited to the maximum torque line R6 (corresponding to the rated output of 30 PS) or below.

As shown in FIG. 9B, when the economy mode E is selected and the coolant temperature Tw is in the medium temperature range B, the engine 1 is controlled so that the power curve R3 (corresponding to the rated output of 100 PS) is obtained. In this case, the fan horsepower (indicated by the oblique lines) is 50 horsepower, and the torque input to the traveling power train 10 is limited to the maximum torque line R5 (corresponding to the rated output of 50 PS) or below.

As shown in FIG. 9C, when the economy mode E is selected and the coolant temperature Tw is in the low temperature range C, the engine 1 is controlled so that the power curve R3 (corresponding to the rated output of 100 PS) is obtained. In this case, the fan horsepower (indicated by the oblique lines) is 30 horsepower, and the torque input to the traveling power train 10 is limited to the maximum torque line R4 (corresponding to the rated output of 70 PS) or below.

As seen from FIGS. 7A, 8A, and 9A, when the work modes P, S, and E are sequentially switched over while the coolant temperature is high, the torque input to the traveling power train 10 is also varied sequentially to the maximum torque line R4 (corresponding to the rated output of 70 PS), to the maximum torque line R5 (corresponding to the rated output of 50 PS), and to the maximum torque line R6 (corresponding to the rated output of 30 PS). Therefore, when the coolant temperature is high, the engine 1 can be operated, depending on the selection of the work mode P, S, E, with the importance placed on the amount of work or on the fuel economy as required.

The same can be applied to when the torques input to the traveling power train 10 are averaged out. The coolant temperature fluctuates while the engine is operating during the day. Accordingly, it can be assumed that the torque input to the traveling power train 10 is substantially equivalent to an average of the torques input thereto when the coolant temperature is in the ranges A, B, and C.

As shown in FIGS. 7A, 7B, and 7C, the torques input to the traveling power train 10 when the power mode P is selected are high even when averaged (the averaged horsepower for the maximum torque lines R4, R4, and R4 when the coolant temperature is in the respective ranges is 70 PS). As shown in FIGS. 8A, 8B, and 8C, the torques input to the traveling power train 10 when the standard mode P is selected assume an intermediate value even when averaged (the averaged horsepower for the maximum torque lines R5, R4, and R4 when the coolant temperature is in the respective ranges is 63.3 PS), whereas the torques input to the traveling power train 10 when the economy mode S is selected are low even when averaged (the averaged horsepower for the maximum torque lines R6, R5, and R4 when the coolant temperature is in the respective ranges is 50 PS).

Consequently, even when consideration is made for the operation in the span of a day, the engine 1 can be operated, depending on the selection of the work mode P, S, or E, with the importance placed on the amount of work or on the fuel economy as required.

When the power mode P is selected, the maximum power curve R1 is selectable. However, when the coolant temperature is in the middle range B or the low range C, the power curve R2 or R3 whose torque value and rated output are lower than those of the maximum power curve R1 is selected instead of the maximum power curve R1. This makes it possible to suppress the input torque transmitted to the traveling power train 10 to the upper limit (corresponding to the rated output of 70 PS) or below (see FIGS. 7B and 7C).

Similarly, when the standard mode S is selected, the maximum power curve R2 is selectable. However, when the coolant temperature in the low range C, the power curve R3 whose torque value and rated output are lower than those of the maximum power curve R2 is selected instead of the maximum power curve R2. This makes it possible to suppress the input torque transmitted to the traveling power train 10 to the upper limit (corresponding to the rated output of 70 PS) or below (see FIG. 8C).

Consequently, according to the present embodiment of the invention, regardless of which of the work modes P, S, and E is selected, it is possible to prevent the input of excessive traveling horsepower to the traveling power train 10 and to ensure the durability for the traveling power train 10. Additionally, there is no need of providing the traveling power train 10 with an excessively high strength, and thus the production cost of the traveling power train 10 can be reduced.

The foregoing embodiment may be modified in various manners as follows.

Although in the embodiment, as shown in FIG. 5, the power curves R1, R2, and R3 are switched over depending on the coolant temperature range A, B, or C, hysteresis may be provided to prevent hunting.

In FIG. 5, the power curve is selected with the coolant temperature range being divided into three ranges A, B, and C. However, the coolant temperature range may be divided into two ranges (high and low temperature ranges), or may be divided into four or more ranges.

Although the power curve is selected depending on the magnitude of the coolant temperature Tw, the coolant temperature Tw is an example only. The power curve may be selected depending on any other parameter as long as it represents the magnitude (fan horsepower) of the load on the cooling fan 16. For example, fan speed Nf, or swash plate inclination angle of the fan hydraulic pump 9 may be used in place of the coolant temperature Tw. Alternatively, the horsepower or load (torque) consumed by the cooling fan 16 may be directly measured so that the power curve is selected according to the measurement value.

Although the first embodiment described above is based on the assumption of the cooling fan 16 that is used for cooling the coolant, this is only an example. The present invention is also applicable to a cooling fan for cooling hydraulic oil or the like. The cooling fan may cool any arbitrary medium.

Further, although the first embodiment described above is based on the assumption of the hydraulically driven cooling fan 16 that is driven by the hydraulic pump 9 and the hydraulic motor 15, the invention is applicable to any other type of cooling fan as long as it is driven by the output of the engine 1. For example, the present invention is applicable to an electrically driven cooling fan that is driven by electric power generated by an electric generator which is driven by the engine 1.

Although the first embodiment described above is based on the assumption that there are three selectable work modes P, S, and E, this is only an example. The present invention is also applicable to when the work mode is selected from two or less work modes, or from four or more work modes. Additionally, although the embodiment above is based on the assumption that the work mode is switched stepwise, the present invention is also applicable to when the work mode is varied continuously.

Further, the foregoing description of the first embodiment has been made on the assumption that the cooling fan 16 is of a large size, and the fan horsepower has an unnegligible magnitude in comparison to that of the engine horsepower. However, the present invention is also applicable to when an auxiliary device consuming an unnegligible horsepower in comparison with the engine horsepower is driven by the engine 1. For example, when an auxiliary device such as a compressor or an electric generator is driven by the engine 1, the magnitude of the load on the auxiliary device may be detected so that the power curve is selected according to the detected magnitude of the load on the auxiliary device. In this case, the items in the data table of FIG. 5, "high temperature range A", "medium temperature range B", and "low temperature range C" are replaced by "when the auxiliary device load is high", "when the auxiliary device load is medium", and "when the auxiliary device load is low", respectively.

The present invention is also applicable to when a plurality of auxiliary devices are used together, or when an auxiliary device and a cooling fan are used together.

The description above of the first embodiment has been made on the assumption that the working horsepower is substantially negligible, and the relationship:

Engine horsepower=traveling horsepower+fan horsepower is established.

However, the traveling horsepower is substantially negligible in some work vehicles, and thus the relationship:

Engine horsepower=working horsepower+fan horsepower is established. In this case, the present invention can be similarly embodied by replacing the "traveling horsepower" in the embodiment above with "working horsepower". In this case, an upper limit is set for the torque input to the work machine drive equipment (7, 11, 13) instead of the upper limit for the torque input to the traveling power train 10 only (corresponding to the rated output of 70 PS), and an engine's power curve is selected such that the torque input to the work machine drive equipment (7, 11, 13) does not surpass the upper limit regardless of which work mode is selected or regardless of the level of the coolant temperature.

It will be obvious that the present invention is also applicable to when neither the traveling horsepower nor the working horsepower is negligible, that is, when the relationship:

Engine horsepower=traveling horsepower+working horsepower+fan horsepower is established. In this case, an upper limit is set for the torque input to the traveling power train 10 and the work machine drive equipment (7, 11, 13) instead of the upper limit for the torque input to the traveling power train 10 (corresponding to the rated output of 70 PS), and an engine's power curve is selected such that the torque input to the traveling power train 10 and the work machine drive equipment (7, 11, 13) does not surpass the upper limit regardless of which work mode is selected, or regardless of the level of the coolant temperature.

Second Embodiment

In the first embodiment described above, the drive of the cooling fan 16 is controlled, as shown in FIG. 6B, so as to increase the fan speed Nf according to the increase of the coolant temperature Tw, while no consideration is given to the magnitude of the engine speed.

A second embodiment of the present invention will be described in which the drive of the cooling fan 16 is controlled in consideration of the magnitude of the engine speed.

Figure 10A:
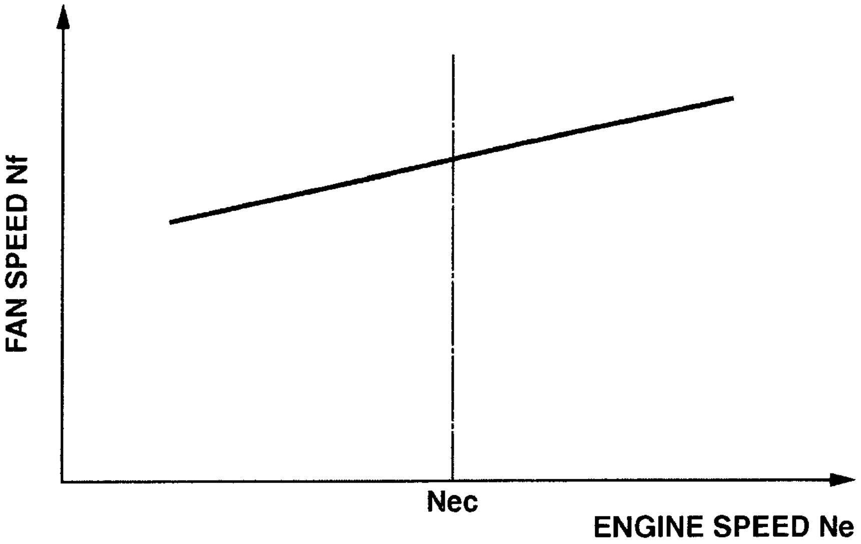

FIG. 10A is a diagram schematically showing a comparative example to this second embodiment, illustrating relationship between speed Ne of the engine 1 and fan speed Nf of the cooling fan 16. As shown in FIG. 10A, the speed Nf of the cooling fan 16 increases in proportion to the increase of the speed Ne of the engine 1. This means that, in the low speed range where the engine speed Ne is lower than a predetermined speed Nec, the fan speed Nf decreases in proportion to the decrease of the engine speed Ne, while the fan horsepower is not decreased significantly in the low speed range of the engine 1.

In the low speed range of the engine 1, however, the calorific heat value of the engine 1 is low. Therefore, in the low engine speed range, as shown in FIG. 10A, there is little need of maintaining the fan speed Nf or the fan horsepower high to keep the cooling capacity high. The cooling capacity for the engine 1 will be kept at a sufficient level even if the fan speed Nf is decreased significantly in the low engine speed range to restrict the fan horsepower to a significantly low level as shown in FIG. 10B.

The fan speed Nf should rather be decreased significantly in the low engine speed range to restrict the fan horsepower to a significantly low level. Otherwise, the portion of the engine horsepower than can be used as traveling horsepower or working horsepower will be reduced to increase the possibility of occurrence of engine stall. In the power curve of the engine 1, the torque or the horsepower is typically low in the low engine speed region. Therefore, it is generally believed that engine stall likely occurs if the engine speed drops low as a result of increase of the load on the cooling fan 16, the traveling load or the work load. It should be noted that FIGS. 10A and 10B are schematic drawings only for an illustrative purpose. The relationship between the fan speed and the engine speed need not necessarily be proportional as long as the fan speed substantially increases along with the increase of the engine speed.

Figure 11A:
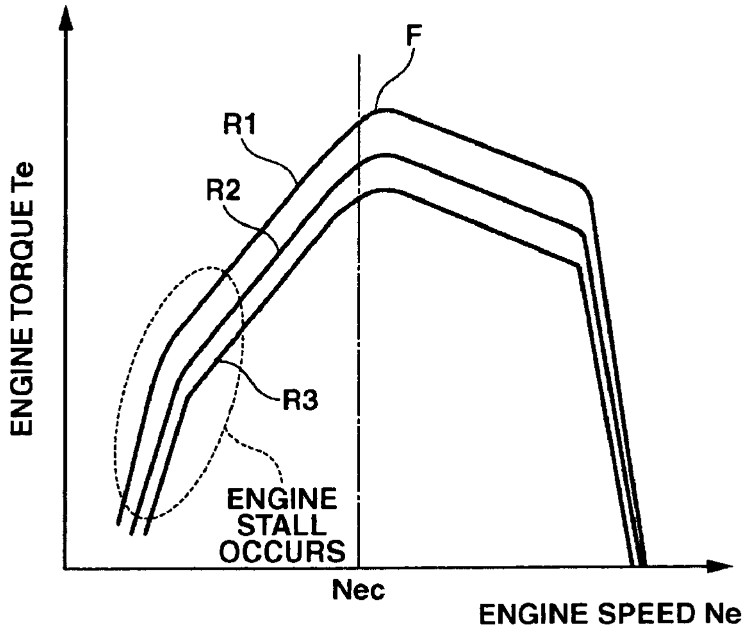

FIG. 11A shows the power curves R1, R2, and R3 which are in the first embodiment above in comparison with each other. As shown in FIG. 11A, the torque or the horsepower drops significantly in the low engine speed range when the low-horsepower power curve R2 or R3 is set, whose torque value or rated output is lower than that of the power curve R1 in which the maximum horsepower the engine 1 can output is obtained. Accordingly, if the cooling fan 16 is controlled such that the fan horsepower is kept high in the low engine speed range (see FIG. 10A), the absolute value of the traveling horsepower or the working horsepower obtained by subtracting the fan horsepower from the engine horsepower will be too low and the possibility engine stall will be increased.

Figure 10B:
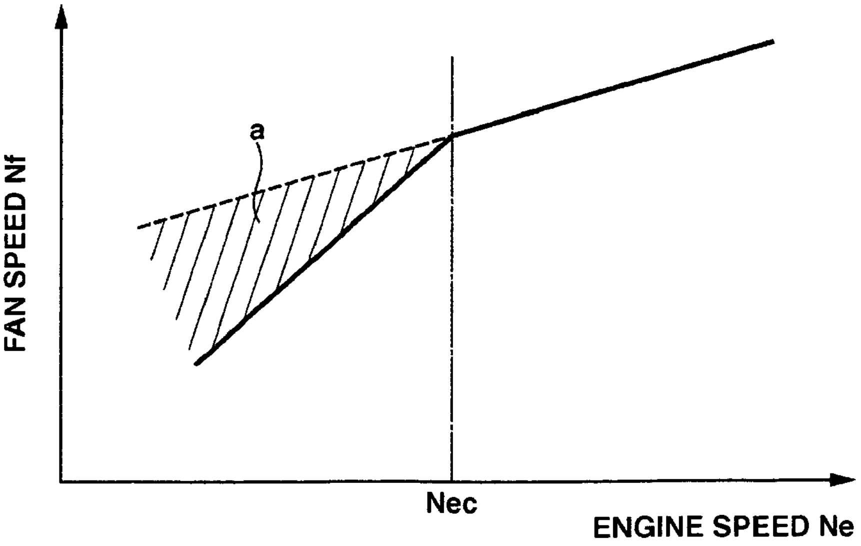
FIG. 10B is a diagram showing the relationship between engine speed and cooling fan speed according to the embodiment of the present invention.

Therefore, according to the second embodiment, as shown in FIG. 10B, the drive of the cooling fan 16 is controlled such that a proportional relationship is established between the engine speed Ne and the fan speed Nf in which the fan speed Nf is reduced along with the decrease of the engine speed Ne more significantly in the low speed range where the engine speed Ne is a predetermined speed Nec or lower than in the high speed range. The fan speed Nf in the low speed range is set to a value such that a necessary traveling horsepower or working horsepower can be ensured without causing engine stall in the low speed range and yet a minimum necessary fan horsepower can be obtained. Accordingly, in the low engine speed range, the fan speed Nf is set to a lower value than the comparative example shown in FIG. 10A by the extent indicated by the oblique lines a in FIG. 10B, and thus the fan horsepower is restricted to a lower level by that much.

On the other hand, in the high speed range of the engine 1, the drive of the cooling fan 16 is controlled in a similar proportional relationship to that of the comparative example (FIG. 10A) such that the fan speed Nf is increased along with the increase of the engine speed Ne. This makes it possible to ensure enough fan horsepower to maintain the coolant temperature in the engine 1 to the target temperature. The relationship between the coolant temperature Tw and the fan speed Nf is similar to that of FIG. 6B described above, and it is assumed that the drive of the cooling fan 16 is controlled so as to increase the fan speed Nf in accordance with the increase of the coolant temperature Tw. In other words, the drive of the cooling fan 16 is controlled in such a manner that the power curve shown in FIG. 10B is "lifted up" in accordance with the increase of the coolant temperature Tw.

Figure 11B:
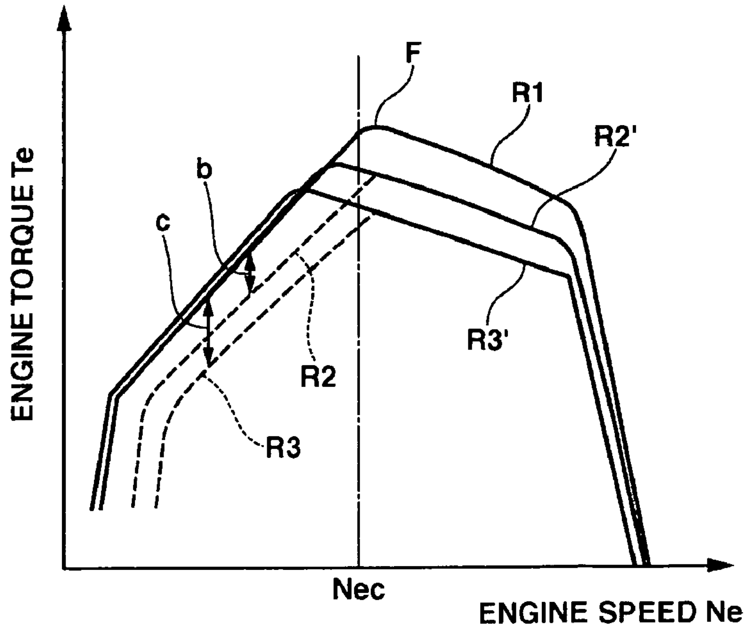

FIG. 11B shows the power curves R1, R2', and R3' which are set in the second embodiment in comparison with each other.

As shown in FIG. 11B, a plurality of power curves R1, R2', and R3' are set such that these power curves follow identical or substantially identical curved paths in the low speed range of the engine 1, whereas the power curves follow different curved paths in the high speed range of the engine 1.

As seen by comparing FIG. 11A and FIG. 11B, this second embodiment is similarly to the first embodiment above in that the low-horsepower power curves R2' and R3' are set, in which lower horsepower is obtained than in the maximum-horsepower power curve R1 in which the maximum horsepower the engine 1 can output is obtained. However, unlike the power curves R2 and R3 according to the first embodiment, these low-horsepower power curves R2' and R3' are set to follow curved paths in which high torque that is the same or substantially the same as the torque on the maximum-horsepower power curve R1 is obtained in the low speed range of the engine 1, and are set to follow curved paths in which a lower torque than the torque on the maximum-horsepower power curve R1 is obtained in the high speed range of the engine.

Like the first embodiment, a power curve is selected in accordance with a selected work mode and magnitude of detected coolant temperature of the engine 1 (detected load on the cooling fan 16), and the engine 1 is controlled such that the selected power curve is obtained. This makes it possible, similarly to the first embodiment, to suppress the horsepower consumed by the traveling power train 10 to the upper limit or below and to keep the coolant temperature of the engine 1 at a target temperature in the high speed range of the engine 1 regardless of which one of the power curves R1, R2', and R3' is selected.

When the maximum-horsepower power curve R1 is selected, the fan horsepower is restricted, in the low speed range of the engine 1, to a lower level by an extent indicated by the oblique lines a in FIG. 10B, and the traveling horsepower (or the working horsepower) is increased by that much. This makes it possible to prevent engine stall when the speed of the engine 1 drops.

When the low-horsepower power curve R2' is selected, the fan horsepower is restricted, in the low speed range of the engine 1, to a lower level by an extent a indicated by the oblique lines in FIG. 10B, and high torque can be obtained similarly to the maximum-horsepower curve R1 as shown in FIG. 11B (the obtained torque is higher than the torque of the low power curve R2 in FIG. 11A by an extent b). Accordingly, the traveling horsepower (or the working horsepower) is increased by that much. This similarly makes it possible to prevent engine stall.

When the low-horsepower power curve R3' is selected, the fan horsepower is restricted, in the low speed range of the engine 1, to a lower level by an extent indicated by the oblique lines a in FIG. 10B, and high torque can be obtained similarly to the maximum-horsepower curve R1 as shown in FIG. 11B (the obtained torque is higher than the torque of the low power curve R3 in FIG. 11A by an extent c). Accordingly, the traveling horsepower (or the working horsepower) is increased by that much. This similarly makes it possible to prevent engine stall.

A description will be made on how the low horsepower curves are set with reference to FIG. 12.

Figure 12:
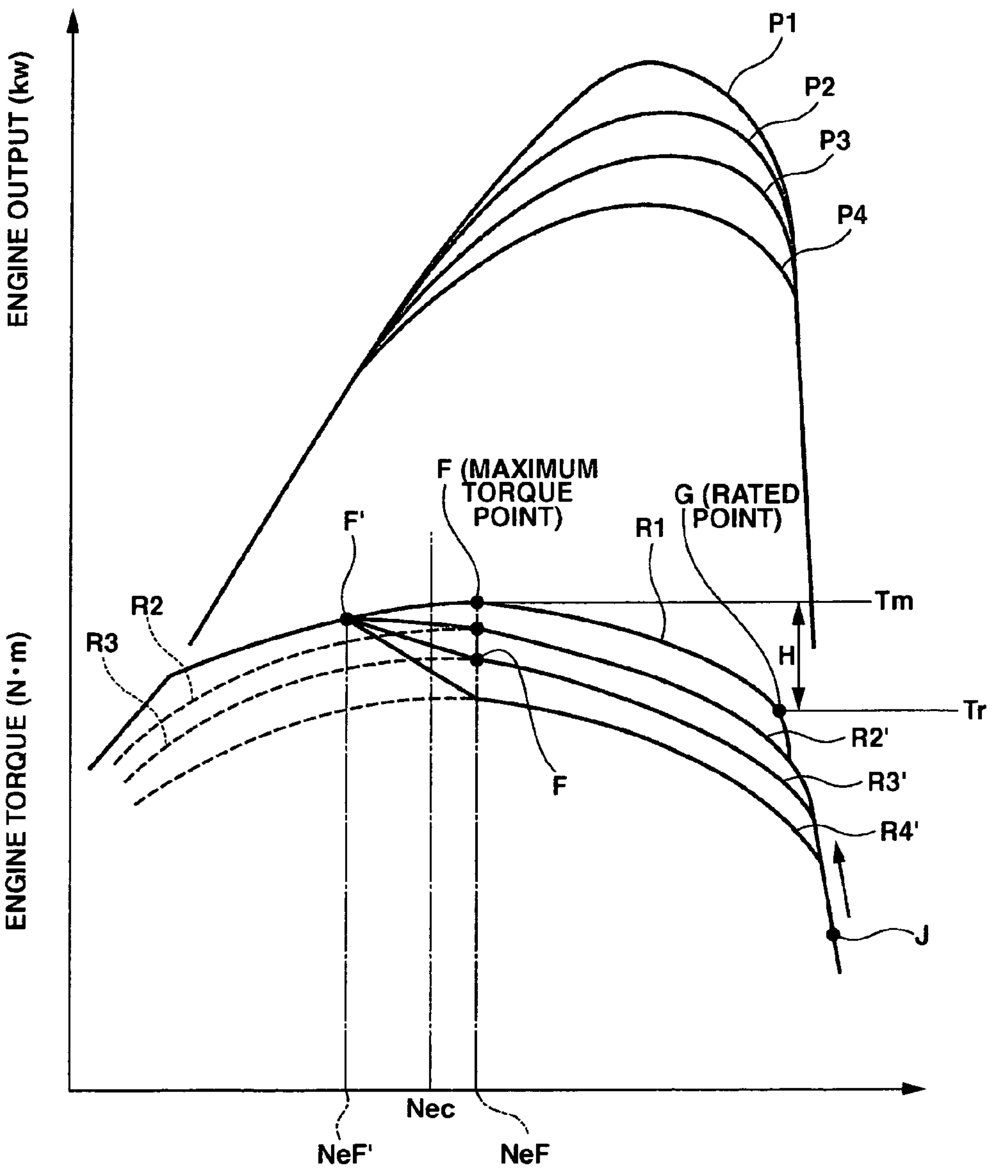
FIG. 12 is a diagram showing several different power curves of high torque rise.

FIG. 12 shows the maximum torque lines (power curves) R1, R2', R3', and R4', and maximum horsepower lines P1, P2', P3', and P4' corresponding to these maximum torque lines (power curves) R1, R2', R3', and R4' according to the second embodiment. The horizontal axis of FIG. 12 indicates the engine speed Ne, while the vertical axis thereof indicates the engine torque (N·m) or engine output (kW). For the purpose of comparison, the power curves R2 and R3 according to the first embodiment are shown by the broken lines in FIG. 12. The power curve R4 is a maximum torque line whose maximum torque is even lower than that of the power curve R3.

It is generally believed that the possibility of occurrence of engine stall becomes lower as the torque rise the engine increases. The torque rise as used herein is a measure representing the toughness of the engine. It is believed that, when a torque value at the rated point G on the maximum torque line R1 is denoted by Tr, and a torque value at the maximum torque point F is denoted by Tm, the possibility of occurrence of engine stall is reduced as $H=Tm-Tr$ becomes higher. The torque rise (%) is represented by the following formula:

$$\text{Torque rise (\%)}=(Tm-Tr)/Tr\times100$$

A bulldozer travels at an activation point J on the maximum torque line R1, and reaches an activation point G during work operation. When a higher load is applied on the engine, the engine speed is decreased to reach an activation point (maximum torque point) F. When an even higher load is applied to the engine, the engine speed is further decreased, surpassing the activation point F, and resulting in engine stall. If the torque rise is high enough, it becomes difficult for the engine speed to surpass the activation point F, and thus the occurrence of engine stall can be prevented.

The low-horsepower power curve R3' according to the second embodiment is set in the manner as described below. Firstly, an engine speed NeF' is set lower than the engine speed NeF corresponding to the maximum torque point F on the low-horsepower power curve R3 according to the first embodiment. This low engine speed NeF' is desirably lower than the threshold speed Nec shown in FIGS. 10A and 10B. Next, the low-horsepower power curve R3' is set so as to follow the same curved path as the low-horsepower power curve R3 in the speed range higher than the engine speed NeF, and to follow the same curved path as the maximum-horsepower power curve R1 in the speed range lower than the engine speed NeF'. In the speed range from the engine speed NeF' to the engine speed NeF, the low-horsepower power curve R3' is set so as to follow the curved path connecting between the point F' on the maximum-horsepower power curve R1 corresponding to the engine speed point NeF' and the point F on the low horsepower curve R3.

The low-horsepower power curve R3' thus set has the maximum torque point defined by the point F' and its torque rise is higher than that of the low-horsepower power curve R3.

Specifically, the low-horsepower power curve R3' having high torque rise is set by drawing a curved line, in the low speed range of the engine 1, such that a high torque that is the same or substantially same as the torque on the maximum-horsepower power curve R1 is obtained, drawing a curved line (the low-horsepower power curve R3), in the high speed range of the engine 1, such that a torque that is lower than that on the maximum-horsepower power curve R1 is obtained, and connecting these curved lines. The other low-horsepower power curve R2' and R4' also can be set in the same manner.

According to the second embodiment as described above, the power curves R2', R3', and R4' are thus set to have high torque rise, which makes it possible to prevent the engine stall more effectively.

FIGS. 13A and 13B are drawings corresponding to FIG. 5 of the first embodiment, showing the contents of data tables according to the second embodiment, namely the selectable work modes and power curves to be selected according to detected coolant temperatures.

FIG. 13A shows a data table when the power curves R1, R2', and R3' are available as selectable power curves. One of the power curves R1, R2', and R3' is selected in accordance with a currently selected work mode, namely one of the power mode P, the standard mode S, or the economy mode E, and a temperature range which a currently detected coolant temperature Tw belongs to, namely one of the high temperature range A, the medium temperature range B, or the low temperature range C, and the engine 1 is controlled so that the selected power mode is obtained.

FIG. 13B shows a data table when the power curves R1, R2', R3', and R4' are available as selectable power curves. In this case, the work mode selection switch 31 of the operating panel 30 is designed to be able to select one of a power mode P, a first standard mode S1, a second standard mode S2, and an economy mode E, while the temperature range of coolant temperature Tw is divided into four temperature ranges, namely a high temperature range A, a first medium temperature range B1, a second medium temperature range B2 that is lower than the first medium temperature range B1, and a low temperature range C. One of the power curves R1, R2', R3', and R4' is selected in accordance with a currently selected work mode, namely one of the power mode P, the first standard mode S1, the second standard mode S2, or the economy mode E, and the temperature range which a currently detected coolant temperature Tw belongs to, namely one of the high temperature range A, the first medium temperature range B1, the second medium temperature range B2, or the low temperature range C, and the engine 1 is controlled so that the selected power curve is obtained.

Third Embodiment

The foregoing description of the second embodiment has been made on the assumption that the work vehicle is provided with the work mode selection switch 31. However, the second embodiment above may be modified as required to be applicable to a work vehicle having no work mode selection switch 31.

For example, the present invention may be embodied, as shown in FIG. 13C, such that the power curve R1 is selected when the detected coolant temperature is in the high temperature range A, the power curve R2 is selected when the detected coolant temperature is in the medium temperature range B, and the power curve R3' is selected when the detected coolant temperature is in the low temperature range C, in the same manner as when the power mode P is selected in FIG. 13A, and the engine 1 is controlled so that a selected power curved is obtained.

The present invention is not limited to application in a bulldozer, but is also applicable to any desired work vehicle, as long as the engine output (engine torque) is distributed to the cooling fan or other auxiliary device.

What is claimed is:

1. An engine control apparatus for use in a work vehicle in which an engine torque is transmitted to a traveling body and/or a work machine as well as to a cooling fan to perform traveling and/or work operation as well as to drive the cooling fan, the engine control apparatus comprising:

work mode selection means for selecting a work mode according to a magnitude of traveling load and/or workload;

fan load detection means for detecting a magnitude of load on the cooling fan;

power curve setting means in which a plurality of power curves each representing a relationship between an engine speed and the torque are set;

power curve selection means for selecting, when one of the work modes is selected by the work mode selection means, a power curve from among the power curves selectable for the selected work mode in accordance with the magnitude of the load on the cooling fan, so that input torque transmitted to the traveling body and/or the work machine does not surpass an upper limit of the input torque transmitted to the traveling body and/or the work machine, the selectable power curves being predetermined for each of the work modes and the upper limit of the input torque transmitted to the traveling body and/or the work machine being predetermined; and control means for controlling the engine so that the selected power curve is obtained.

2. An engine control apparatus for use in a work vehicle in which an engine torque is transmitted to a traveling body and/or a work machine as well as to an auxiliary device to perform traveling and/or work operation as well as to drive the auxiliary device, the engine control apparatus comprising:

work mode selection means for selecting a work mode according to a magnitude of traveling load and/or workload;

auxiliary device load detection means for detecting a magnitude of load on the auxiliary device;

power curve setting means in which a plurality of power curves each representing a relationship between an engine speed and the torque are set;

power curve selection means for selecting, when one of the work modes is selected by the work mode selection means, a power curve from among the power curves selectable for the selected work mode in accordance with the magnitude of the load on the auxiliary device, so that input torque transmitted to the traveling body and/or the work machine does not surpass an upper limit of the input torque transmitted to the traveling body and/or the work machine, the selectable power curves being predetermined for each of the work modes and the upper limit of the input torque transmitted to the traveling body and/or the work machine being predetermined; and control means for controlling the engine so that the selected power curve is obtained.

3. An engine control apparatus for use in a work vehicle in which an engine torque is transmitted to a traveling body and/or a work machine as well as to a cooling fan to perform traveling and/or work operation as well as to drive the cooling fan, the engine control apparatus comprising:

fan load detection means for detecting a magnitude of load on the cooling fan;

cooling fan control means for controlling the drive of the cooling fan so that, in a low speed range where an engine speed is a predetermined speed or lower, a fan horsepower consumed by the cooling fan is limited to a lower value than that in a high speed range in order to ensure necessary horsepower for the traveling body and/or the work machine;

power curve setting means in which a plurality of power curves each representing a relationship between the engine speed and the torque are set, the power curves following same or substantially same curves in the low engine speed range, while following different curves in the high engine speed range;

power curve selection means for selecting one of the power curves according to a magnitude of the detected load on the cooling fan, so that an input torque transmitted to the traveling body and/or the work machine does not surpass an upper limit for the input torque, the upper limit of the input torque transmitted to the traveling body and/or the work machine being predetermined; and control means for controlling the engine so that the selected power curve is obtained.

4. The engine control apparatus for use in a work vehicle according to claim 3, wherein:

there are set in the power curve setting means a maximum-horsepower power curve on which a maximum horsepower that the engine can output is obtained and a low-horsepower power curve on which a lower horsepower than on the maximum-horsepower power curve is obtained; and the low-horsepower power curve is set as a power curve having high torque rise by drawing a curved line on which same or substantially same high torque as on the maximum-horsepower power curve is obtained in the low speed range of the engine, drawing a curved line on which a lower torque than on the maximum-horsepower power curve is obtained in the high speed range of the engine, and connecting these curved lines.

5. The engine control apparatus for use in a work vehicle according to claim 3, further comprising:

work mode selection means for selecting a work mode according to a magnitude of traveling load and/or workload, wherein:

a plurality of selectable power curves are predetermined for each of the work modes so that the power curves follow same or substantially same curves in the low engine speed range and follow different curves in the high engine speed range;

the upper limit is set for the input torque transmitted to the traveling body and/or the work machine; and when one of the work modes is selected by the work mode selection means, the power curve selection means selects a power curve from among the power curves selectable for the selected work mode in accordance with the magnitude of the detected load on the cooling fan, so that the input torque transmitted to the traveling body and/or the work machine does not surpass the upper limit of the input.

6. The engine control apparatus for use in a work vehicle according to claim 5, wherein:

there are set in the power curve setting means a maximum-horsepower power curve on which a maximum horsepower that the engine can output is obtained and a low-horsepower power curve on which a lower horsepower than on the maximum-horsepower power curve is obtained; and the low-horsepower power curve is set as a power curve having high torque rise by drawing a curved line on which same or substantially same high torque as on the maximum-horsepower power curve is obtained in the low speed range of the engine, drawing a curved line on which a lower torque than on the maximum-horsepower power curve is obtained in the high speed range of the engine, and connecting these curved lines.

* * * * *